Mar. 27, 1923.

W. G. WILSON

HOSE COUPLING

Filed July 19, 1921

1,450,126

William G. Wilson.
INVENTOR

BY Victor J. Evans
ATTORNEY

WITNESS:

Patented Mar. 27, 1923.

1,450,126

UNITED STATES PATENT OFFICE.

WILLIAM G. WILSON, OF WEST NEW BRIGHTON, NEW YORK.

HOSE COUPLING.

Application filed July 19, 1921. Serial No. 485,796.

*To all whom it may concern:*

Be it known that I, WILLIAM G. WILSON, a citizen of the United States, residing at West New Brighton, in the county of Richmond and State of New York, have invented new and useful Improvements in Hose Couplings, of which the following is a specification.

This invention relates to hose couplings and the principal object is to provide a device of this nature with a gasket so formed and positioned as to expand under the pressure of the water to form a tight seal and without cracking said gasket.

Another object is to provide a device of this nature which shall be simple of construction, cheap to manufacture, and highly efficient for the purpose for which it is designed.

With these and other objects in view which will be more apparent at the specification proceeds, the invention resides in certain novel construction and combination and arrangement of parts, the essential features of which are hereinafter fully described, are particularly pointed out in the appended claim and are illustrated in the accompanying drawing, in which:—

Like characters of reference refer to like parts in all views.

Figure 1:
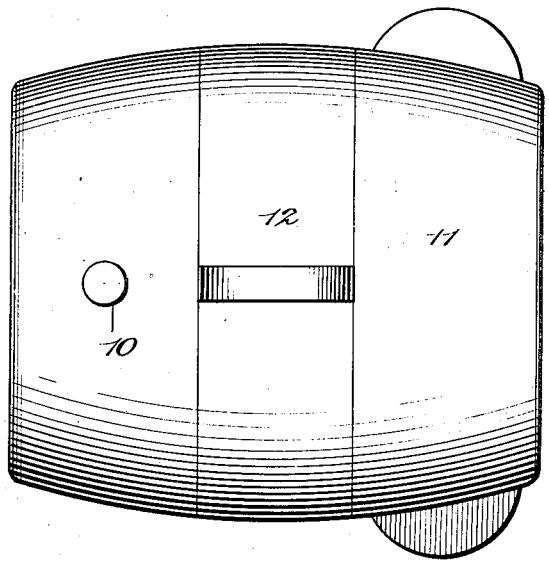
Figure 1 is a side elevation of my improved hose coupling.
Figure 2:
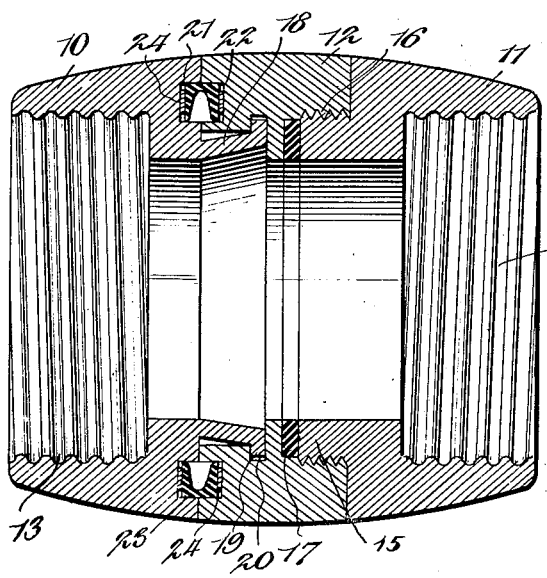
Figure 2 is a longitudinal section of the same.
Figure 4:
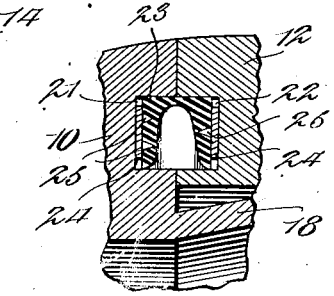
Figure 4 is a fragmentary enlarged sectional view illustrating the gasket construction.
Figure 3:
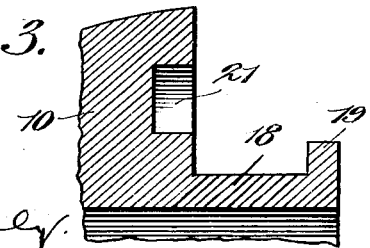
Figure 3 is a fragmentary detail of the flange end of the swivel member before being expanded.

Referring to the drawing in detail, 10 and 11 represent the end portions of the coupling, and 12 represents the intermediate portion thereof which is swiveled on the member 10 and threadedly engages member 11 as will now be described. Members 10 and 11 are provided with threads at 13 and 14 for attachment to hose sections, as is usual.

The member 11 is provided with a reduced and threaded portion 15 which engages with an internally threaded portion 16 of member 12 and abuts against a gasket 17 to effect a seal between members 11 and 12.

Member 10 is formed with a sleeve-like inner end 18 terminating in a flange 19 which is expanded into a seat or annular groove 20 in member 12 so that members 10 and 12 are swiveled together. Mating annular grooves 21 and 22 are cut in the co-active faces of the members 10 and 12 and seated in this housing formed by grooves 21 and 22 is a rubber gasket 23 faced on its sides by brass washers 24. The brass washers receive the wear of the parts due to the rotation of member 12 on member 10, and are struck out in tangs 25 which sink into and grip gasket 23. Gasket 23 is formed in substantially U-shaped cross-section so that when the water is forced against the inner surface, the legs will expand to effect a tight seal, and there will not be the tendency to split the gasket that there would be if the gasket had an angular inner outline.

What is claimed as new is:—

The combination of a pair of members, each provided with a portion for engagement with a hose section, an intermediate member swivelled to one of said members and threadedly engaging the other of said members, a gasket of U-shaped cross-section interposed between said intermediate member and that one of said pair of members to which said intermediate member is swivelled, and metal facing on opposite sides of said gasket and secured thereto by tangs struck out from said metal facings.

In testimony whereof I have affixed my signature.

WILLIAM G. WILSON.